(No Model.)  5 Sheets—Sheet 3.
P. TRAISER, II.
MACHINE FOR MANUFACTURING CHEESE.
No. 541,642. Patented June 25, 1895.
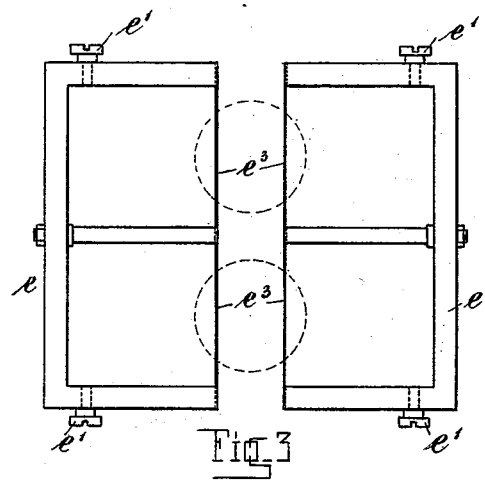
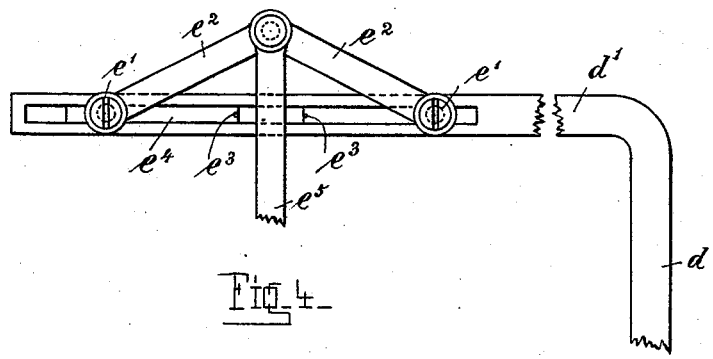

(No Model.) 5 Sheets—Sheet 5.
P. TRAISER, II.
MACHINE FOR MANUFACTURING CHEESE.

No. 541,642. Patented June 25, 1895.

Witnesses:
L. M. Wachschley
Fred E. Muss.

Inventor
Peter Traiser II
By Briesen & Knauth
his Attorneys.

UNITED STATES PATENT OFFICE.

PETER TRAISER, II, OF GROSS GERAU, GERMANY.

MACHINE FOR MANUFACTURING CHEESE.

SPECIFICATION forming part of Letters Patent No. 541,642, dated June 25, 1895.

Application filed November 30, 1894. Serial No. 530,316. (No model.) Patented in Germany October 23, 1892, No. 69,905, and January 26, 1894, No. 73,236.

*To all whom it may concern:*

Be it known that I, PETER TRAISER, II, manufacturer of cheese, residing at Gross Gerau, in the Grand Duchy of Hessen, Germany, have invented new and useful Improvements in Machinery for Manufacturing Cheese, (for which I have obtained Letters Patent in Germany, No. 69,905, dated October 23, 1892, and No. 73,286, dated January 26, 1894,) of which the following is a specification.

My invention relates to machinery or apparatus for making cheese from prepared curd, and laying it down upon a suitable bed to dry, the apparatus being designed to automatically carry out the processes which have hitherto been separately performed by hand, of thoroughly mixing and kneading the curd, dividing it into the quantities required to form single cheeses, molding and pressing the portions into finished cheeses of any desired form, and depositing them at determined distances from one another, upon a bed board, or the like.

To this end my invention consists in the novel arangement and combination of parts hereinafter described and claimed.

In order that my invention may be clearly understood, I have affixed drawings, in which two modifications of the same are represented.

Figure 1:
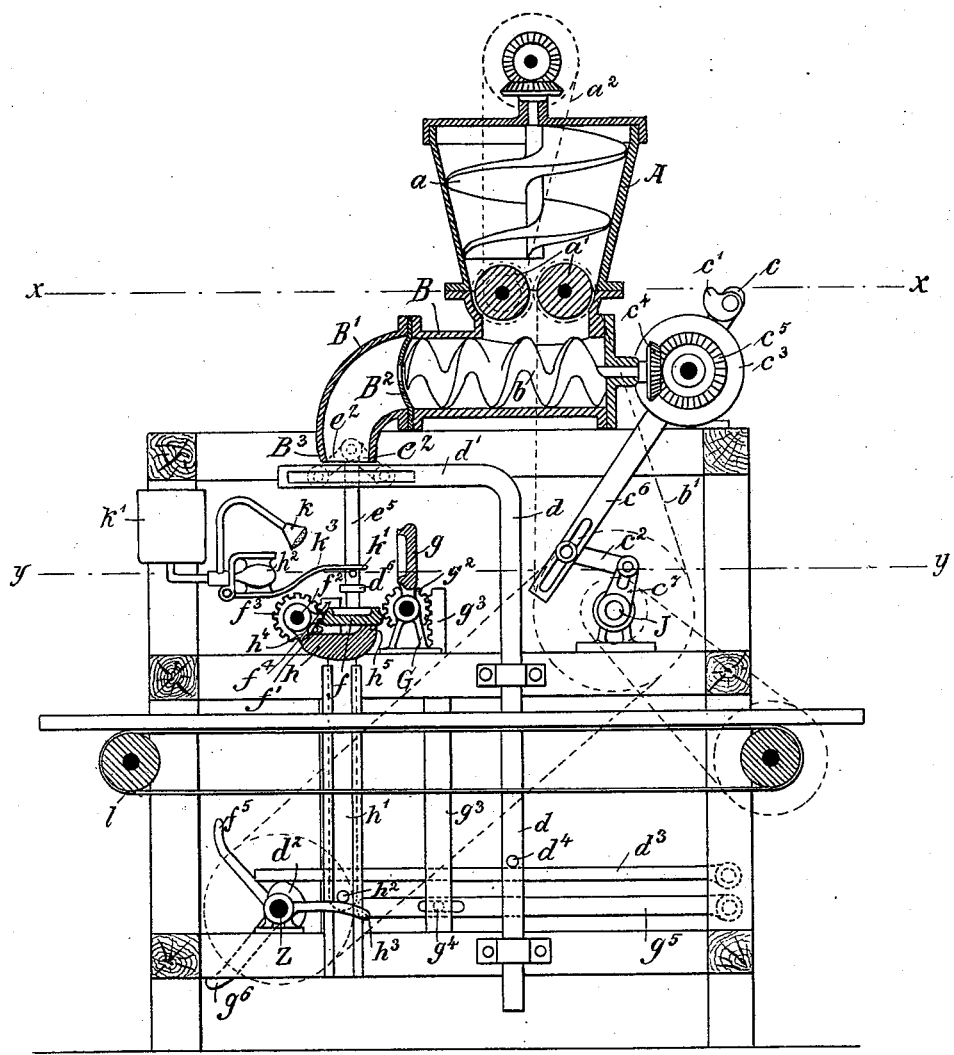
Figure 2:
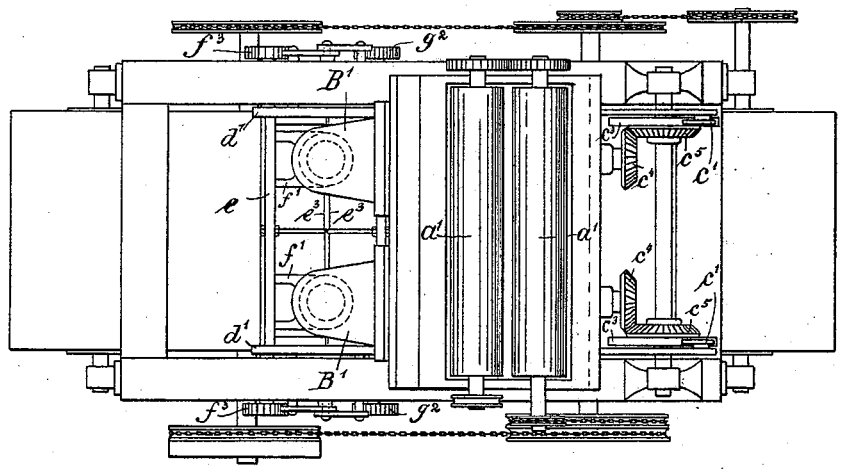
Figure 2A:
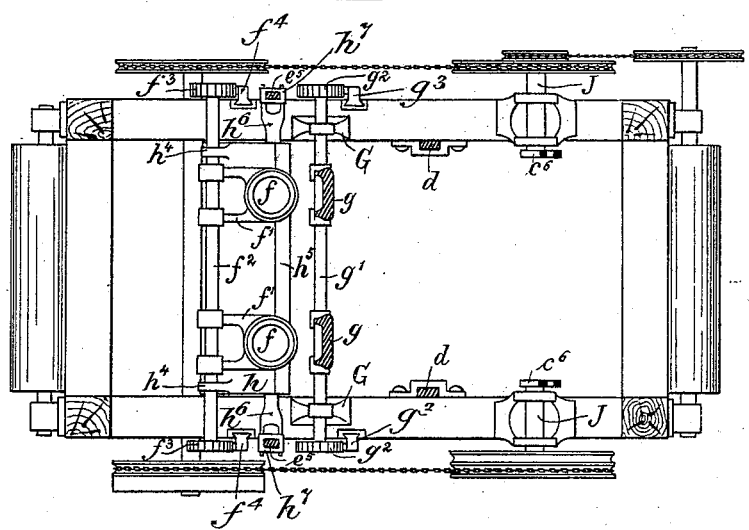

Figure 1 is a longitudinal vertical sectional view of the machine made in accordance with my invention. Fig. 2 is a longitudinal horizontal section of the same on the line $x\ x$ of Fig. 1. Fig. $2^a$ is a like view of the same on the line $y\ y$ of Fig. 1. Figs. 3, 4, 5, 6, and 7 show details of the machinery. Fig. 8 is a longitudinal vertical section illustrating a modification of the invention.

A is a hopper into which the curd is filled, and wherein it is kneaded by a screw $a$ to the kneading rolls $a'\ a'$. These rolls knead the curd and feed it into a number of receivers B situated below the rollers one beside the other, and each one provided with a feeding screw or creeper $b$. These mix again the material and convey it to the mouth piece B' through a centrally perforated plate or funnel $B^2$. The object of this plate or funnel is to retard the curd under the action of the screw $b$ and to leave a channel in the center. The mouth piece B' is detachable that it may be more easily cleaned. Pepper, salt, caraway seed or other ingredients to be incorporated into the cheese are supplied in the hopper A also.

Motion is imparted to the screw $a$ and the rollers $a',\ a'$ from the main shaft J by belts $b'$ and $a^2$, and an intermitting motion to the worm or screw $b$ by the friction pawl $c\ c'$, the arm $c^6$ of which is oscillated by the crank $c^7$ and the link $c^2$, and by the conical gear $c^4\ c^5$. Slots in the arm $c^6$ and the crank $c^7$ serve to regulate the position of the connecting pins and thereby the speed of rotation of the worm $b$.

By the action of the described elements curd is delivered intermittingly from the mouth piece B' at the point $B^3$. At this point the delivered curd is divided into pieces of equal size by a cutting-off mechanism. This mechanism is supported by a vertically guided bar $d$ having a horizontal arm $d'$, and is lifted by means of a cam $d^2$, a pivoted lever $d^3$ and a pin $d^4$. The arm $d'$ carries in the slot $e^4$ two movable frames $e\ e$. (See Fig. 4.) A wire $e^3$ is stretched over the inner side of each frame. These frames are located under the mouths $B^3$ of the receivers B, and receive an inwardly and outwardly reciprocating motion by means of the joint levers $e^2$ pivoted to the frames by the screws $e'$, and the vertically reciprocating bar $e^5$, which is lifted in the appropriate time in a manner which will be hereinafter described. The wires on the frames $e$ may be replaced by knives, if the curd is not consistent enough to be kept unsupported in the orifices $B^3$.

Below the cutting mechanism is the molding mechanism into which the detached pieces fall down. It consists in a lower mold $f$ and an upper mold $g$.

Figure 6:
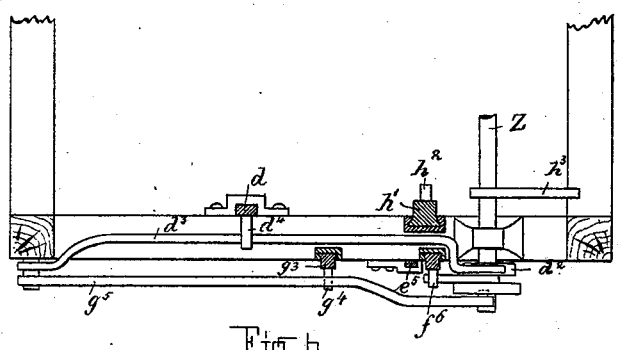
Figure 5:
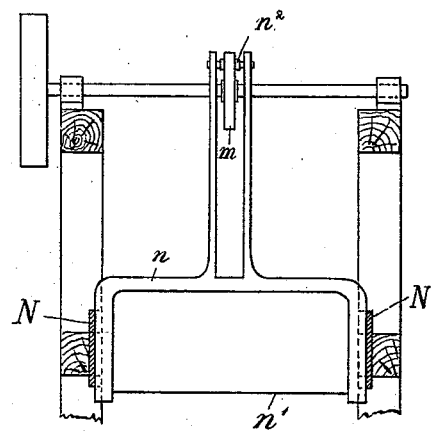

All the lower molds $f$ (two in the drawings) are supported at one end by a transverse bar $h$, which is raised and lowered by the vertical sliding bars $h'\ h'$, pin $h^2$ and cam $h^3$. The rotatable molds $f$ are fixed on the shaft $f^2$ by arms $f'$. This shaft $f^2$ is mounted in brackets $h^4$ carried by the bar $h$, and may be oscillated by the tooth wheel $f^3$ rigidly connected to the end of such shaft. The rear part of the molds $f$ rests on the rail $h^5$ of the bar $h$. By this mechanism the molds are raised, if a piece of curd is to be cut off. If the molds $f$ have been lowered again the upper molds $g$ are rotated and folded down by the following mechanism: The molds $g$ are rotatively carried in the brackets G and fixed on shaft $g'$ on which the tooth wheel $g^2$ is rigidly fixed also. This wheel is turned by the rack $g^3$, pin $g^4$, pivoted arm $g^5$, and cam $g^6$ from the shaft Z. After the molds are reopened again the lower molds $f$ are turned to deliver the cheese on an apron in the following way: A rack $f^4$ is in gear with the tooth wheel $f^3$ and is lifted by it while the bar $h$ is rising. After the bar $h$ has come to its normal position again the rack $f^4$ is lifted from the main shaft Z by the cam $f^5$ and a pin $f^6$ on the rack (Fig. 6). From the bar $h$ extends laterally at each side an arm $h^6$, which embraces by a ring $h^7$, the rod $e^5$ of the cutting-off device. This rod is lifted as soon as the said ring reaches the ring $d^6$ (Fig. 1) fixed to the rod $e^5$ and pushes it upward. There is an apparatus for moistening the rising molds $f$ consisting of a rose $k$ fed with water from the reservoir $k'$, an arm $k^3$ actuated by a pin on the rod $e^5$, and an india-rubber ball $k^2$, which is compressed by the arm and causes the ejection of a certain amount of water. The cheeses fall from the molds $f$ on a moving apron $l$ which carries them away.

Fig. 8 shows a modification of the machine. There is a channel M added to the mouth piece, which channel bends downwardly and into a horizontal plane, and is tapering. This modification is especially adapted for the production of long thin cheeses. The cheeses are immediately delivered on the apron $l$ and carried away. A modification of the cutting-off device is also shown, which I prefer for this modification.

A frame $n$ (shown in detail in Fig. 5) carries the stretched wire $n'$, and is guided by the guide pieces N N. A little anti-friction roller $n^2$ is carried on the upper part of the frame which embraces the cam wheel $m$ and bears upon said cam wheel. The contour of this cam allows a rapid descending of the frame and cutting off of the cheese.

Figure 7:
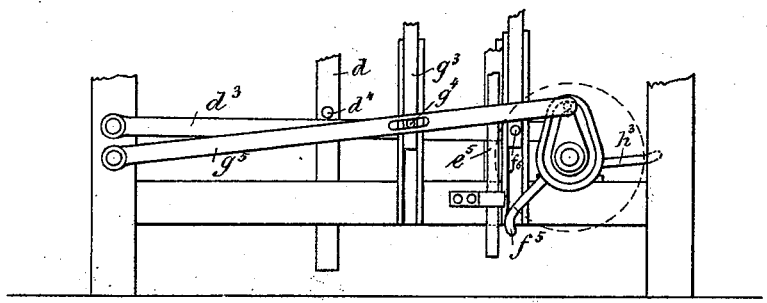
Figure 8:
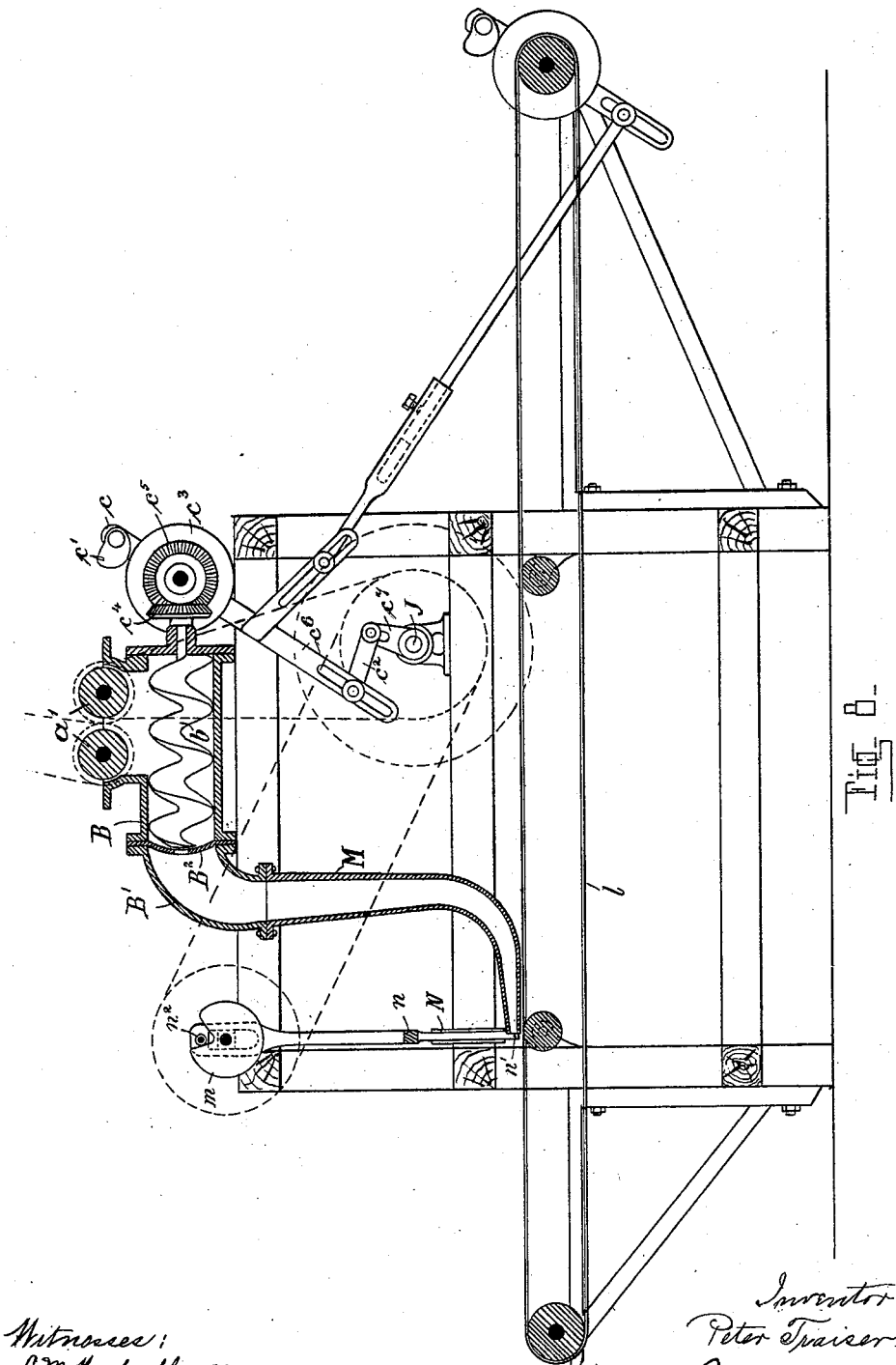

Figs. 6 and 7 show a modification of the cam $g^6$ by which a positive motion is obtained.

Now, what I claim, and desire to secure by Letters Patent, is—

1. A machine for manufacturing cheese out of curd comprising means for kneading the curd, mouth pieces through which the kneaded curd escapes, a cutting-off device for detaching the curd protruding from the mouth pieces, movable molds adapted to receive the curd from the cutting-off device after said curd has been cut and to deliver it again after forming, and means to receive the ready cheeses, and carry them away, substantially as described.

2. In a machine for manufacturing cheese, the combination with a vertical receiving hopper, of a vertical screw contained therein, horizontal rollers at its bottom, separate horizontal receiving chambers communicating with said hopper below the rollers, a screw located in each of the receivers, and a mouthpiece at the end of each one thereof, and means for intermittently rotating each of the screws in the receivers substantially as described.

3. In a machine for manufacturing cheese, the combination with a cutting-off device and molds, together with means for supplying curd thereto, of mechanism adapted to lift the cutting-off device before it is actuated, and means to lift the molds at the moment the curd is cut off, substantially as described.

4. In a machine for manufacturing cheese the combination with a water rose, of the mold, and means to actuate it before the mold is filled, substantially as described.

5. In a machine for manufacturing cheese, the combination with means for supplying curd, of a transverse bar adapted to be raised and lowered, a lower mold rotatively fixed on the said bar, means to turn the lower mold over, an upper mold, and means to fold the upper mold down on the lower mold, and to turn it back again.

6. In a machine for manufacturing cheese, the combination with the mouth piece delivering the curd, of a cutting off device comprising two frames, a wire stretched over the inside of each frame, a mechanism adapted to lift the frames to the orifice of the mouth piece, and mechanism adapted to move the two frames against each other, substantially as described.

In testimony whereof I have signed my name to this specification in the presence of two subscribing witnesses

PETER TRAISER, II.

Witnesses:
CARL RETTY,
JEAN GRUND.